United States Patent [19]

Lechner et al.

[11] Patent Number: 4,893,309

[45] Date of Patent: Jan. 9, 1990

[54] DIGITAL INTERFACE BETWEEN AT LEAST TWO SUBSCRIBER LINE INTERFACE CIRCUITS AND A PROCESSING UNIT

[75] Inventors: Robert Lechner, Sankt Poelten, Austria; Hans-Werner Rudolf, Munich, Fed. Rep. of Germany; Harald Stader, Munich, Fed. Rep. of Germany; Norbert Wingerath, Munich, Fed. Rep. of Germany; Christopher C. A. Priest, Maidenhead, United Kingdom; Nigel P. Dyer, London, United Kingdom; Robert K. P. Galpin, Knutsford, United Kingdom; Marcello Manca, Milan, Italy; Virgilio Mosca, Milan, Italy; Antonio Nicastro, Milan, Italy; Pierre Albouy; Robert Le Gougnec, both of Lannion, France; Ramatchandirane Nadaradjane, Perros-Guirec, France

[73] Assignee: Siemens AG, Berlin and Munich, Fed. Rep. of Germany

[21] Appl. No.: 147,428

[22] Filed: Jan. 25, 1988

[30] Foreign Application Priority Data

Feb. 12, 1987 [DE] Fed. Rep. of Germany ....... 3704409

[51] Int. Cl.4 .............................................. H04J 3/12
[52] U.S. Cl. ................................ 370/110.1; 370/58.1; 370/68.1
[58] Field of Search ..................... 370/110.1, 68.1, 85, 370/58, 67, 68; 379/399, 93, 94, 338

[56] References Cited

U.S. PATENT DOCUMENTS 4,430,733  2/1984  Hardy et al. ..................... 370/110.1
4,730,308  3/1988  Friedman et al. ................... 370/85

Primary Examiner—Benedict V. Safourek
Assistant Examiner—Ralph E. Smith
Attorney, Agent, or Firm—David N. Caracappa

[57] ABSTRACT

A digital interface between at least two subscriber line interface circuits and a processing unit is described. The interface is configured in the form of a parallel interface. The level of an input/output register and of a control register is allocated, as needed, to the connections of the processing unit. These connections can be operated selectively as inputs or outputs. They can also be operated in two modes, depending upon which type of subscriber line interface circuit (SLIC) is connected. The connections of the last-mentioned units are partially operable as inputs or outputs and partially operable only as inputs but in the input case, selectively for various types of input signals.

3 Claims, 2 Drawing Sheets

DIGITAL INTERFACE BETWEEN AT LEAST TWO SUBSCRIBER LINE INTERFACE CIRCUITS AND A PROCESSING UNIT

CROSS REFERENCE TO RELATED APPLICATION

Rober Lechner et al., U.S. patent application Ser. No. 147,429, titled Digital Interface of an Integrated Subscriber Line Interface Circuit, filed concurrently with the present application on Jan. 25, 1988.

BACKGROUND OF THE INVENTION

1. Field of the Invention

The present invention relates to a digital interface between at least two subscriber line interface circuits for the connection of analog telephone subscriber lines of a digital time-multiplexed telecommunications network and a processing unit performing the coding or decoding and filtering of the telephone data transmitted over the subscriber lines under the control of its own processor, and which also provides the instructions to set up various operating conditions of the subscriber line interface circuits and the instructions which determine the subscriber line status indications initiated by the subscriber line interface circuits.

2. Description of the Prior Art

It is well known that with the aid of integrated circuit technology, the space requirements for relatively complex electrical units have been constantly reduced. A factor that will probably limit this continuing trend is the number of plugs required for such an electrical unit, which, in view of connections that must be made, such as by soldering, cannot be arranged as close to one another as are desirable.

Until now, serial communication interfaces have been provided between integrated subscriber line interface circuits and processing units of the aforementioned type, so that connections have various types of signals coupled thereto or are used to transmit various types of signals, such that the total number of required connections is relatively small in proportion to the number of the various types of signals to be received or transmitted. This, however, means having to accept a longer time to transmit the signals. Additionally, there is an increased circuit expenditure to manage control of such a known serial interface.

In practice, two types of subscriber line interface circuits are applicable. One such interface circuit is the ER-SLIC (External Ringing Subscriber Line Interface Circuit) whose important characteristic differentiating it from the other type of interface circuit is that its ringing current pulses are generated outside of the unit and a relay is used for their feeding in and control. The other type of subscriber line unit is the IR-SLIC (Internal Ringing Subscriber Line Interface Circuit) wherein ringing current and monitoring pulses are derived internally from the supply voltage. One solution for such an IR-SLIC provides an input/output register.

The primary object of the present invention is to provide a digital interface of which is a universal interface for the connection of both types of subscriber line interface circuits and which has a relatively small number of connector plugs, without having the disadvantages of a serial interface.

SUMMARY OF THE INVENTION

The present invention provides an interface which is designed as a parallel interface; having a number of connections provided as a constituent part of the processing unit. The connections have allocated as needed, a level of an input/output register with data to be entered or output or stored therein temporarily as needed, pending a write or read instruction, and a level of a control register, as needed. The connections are activated selectively as a signal input or a signal output depending on which of two possible switching states the respective level of the control register is placed in. These connections can be operated in a first operating mode, in which subscriber line interface circuits are connected and in which the level of an input/output register is likewise allocated to a part of the connections; and in a second operating mode, in which subscriber line interface circuits are connected which lack such an input/output register. In the first operating mode n connections at the processing unit, which are at times connected with the connection of another of n subscriber line interface units, are selectively activated as an output, whereby case they transmit a signal placing the subscriber line interface circuit in operating readiness, and are activated as an output, such that they accept data output by the subscriber line interface unit, while the remaining connections are connected with subscriber line interface circuits and are activated only as outputs of which at least one group of which serves to transmit operating instructions to the subscriber line interface circuits. At the subscriber line interface circuits, one connection respectively is activated as an input that receives the operating readiness signal supplied by the processing unit, or is activated as an output over which, in response to the operating instructions provided by the processing unit to the rest of the connections that are activated as inputs only, the signals corresponding to the results of subscriber line status indications initiated by the subscriber line interface circuit are transmitted. In the second operating mode, all connections at the processing unit in n groups are activated as outputs over which operating instructions for n connected subscriber line interface circuits are transmitted, and n corresponding number of connections at the connected subscriber line interface circuits are connected with the outputs and a further connection for the reception of an operating readiness signal not supplied by the processing unit in this operating mode are activated only as inputs, and one connection only as an output to transmit signals corresponding to the results of the aforementioned subscriber line indications not going to the processing unit.

The invention is described below, with reference to a specific embodiment and accompanying drawings wherein:

DESCRIPTION OF THE PREFERRED EMBODIMENT

Figure 1:
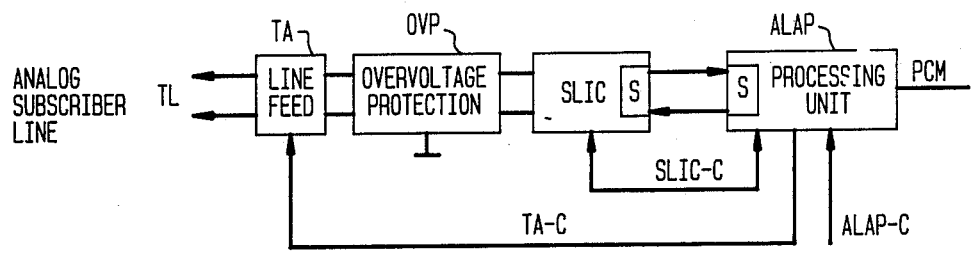
FIG. 1 is a block diagram of a subscriber equipment configuration, in which subscriber line interface circuits and a processing unit have a common interface applicable to the present invention.

FIG. 1 shows the elements required for the connection of an analog subscriber line TL to the switching center of a time multiplexed telecommunications system. This includes a subscriber line interface circuit SLIC, which is an integrated circuit, and which is primarily responsible for the feeding of the subscriber line TL, the feeding in of ringing current, the feeding of metering pulses, line status indication and the determination of signal transmission characteristics. This SLIC operates in conjunction with a processing unit ALAP, in which the coding and decoding functions as well as the filter functions in connection with the analog signals transmitted to the subscriber line are performed. The processing unit ALAP preferably, serves two subscriber lines TL, and is under the control of a microprocessor, (not shown).

The present invention relates to the interface between the processing unit ALAP and the subscriber line interface circuits SLIC, and preferably to two such units.

Figure 2:
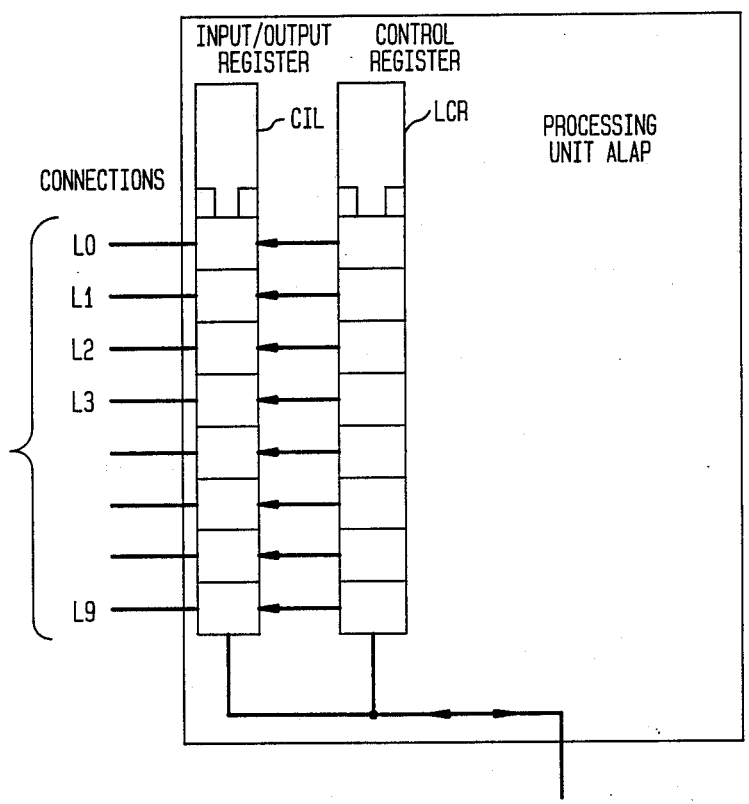
FIG. 2 is a block diagram of a processing unit with pertinent portions of the applicable interface shown in accordance with the present invention.

Referring to FIG. 2, the processing unit ALAP, is shown in greater detail. The processing unit has a plurality of connections. In the example illustrated there ae 10 connections, L0 to L9, to which a level of an input/output register CIL is allocated, as required. Data to be entered or to be given out are temporarily stored in this register pending the receipt of a write or read instruction. A level of the control register LCR is allocated respectively to each of the connections L0 to L9, as well.

The connections L0 to L9 may be selectively activated as either signal inputs or signal outputs. Which of the two states becomes effective depends upon which of the two possible switching states the corresponding level of the control register LCR is placed in.

The connections of the processing unit can be operated in a first and a second operating mode.

Figure 3:
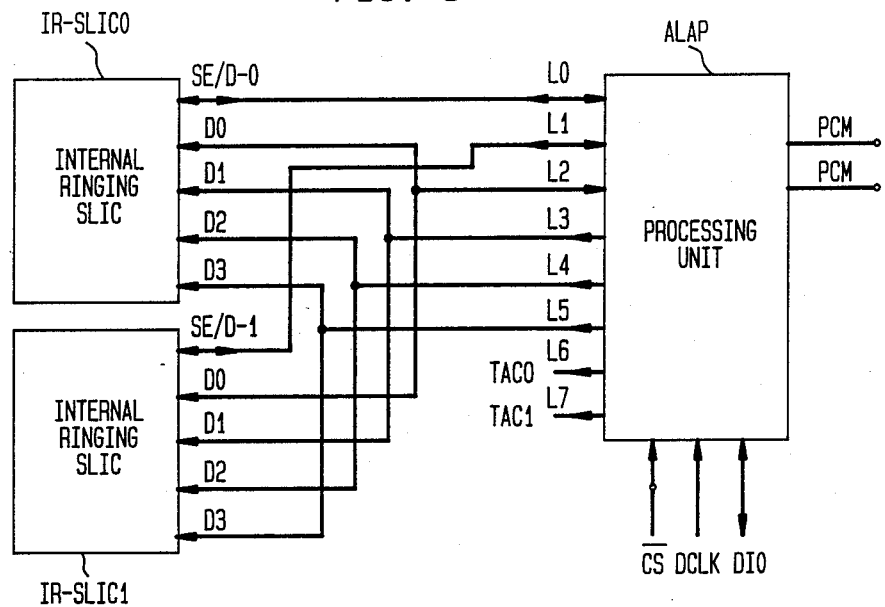
FIG. 3 is a block diagram of the interconnection of a processing unit and IR-SLIC's.

FIG. 3 shows the configuration for the first operating mode. Connected to the processing unit ALAP are subscriber line interface circuits IR-SLIC 1 and IR-SLIC 2, wherein the level of an input/output register (not shown) is likewise allocated to a part of the connections, as required. As also previously described, the subscriber line interface circuits are of the type in which the metering pulses and ringing current are generated internally.

At the processing unit ALAP, in the first operating mode, as many connections as there are subscriber line interface circuits are optionally and selectively activated as outputs and inputs. In the described embodiment, this consists of two connections, e.g. the connection L0, connected with a connection SE/D-0 of the first subscriber line interface circuit IR/SLIC 0, and the connection L1, connected with the connection SE/D-1 of the subscriber line interface circuit IR-SLIC 1. The connections SE/D-0 and SE/D-1 of the subscriber line interface circuits are also optionally activated as inputs and outputs, but are always the exact opposite of the connections of the processing unit with which they are connected.

When the connections L0 and L1 are activated as outputs, the processing unit transmits a signal via these connections to the associated subscriber line interface circuit, which is received by the applicable connection SE/D-0 or SE/D-1 and is therefore activated as an input and functions to place the subscriber line interface circuit in operating readiness.

When the connections L0 and L1 of the processing unit are activated as inputs, they take in data from the applicable subscriber line interface circuit, via the latter's connection SE/D-0 or SE/D-1, at that time activated as outputs, wherein the data comprises the results of subscriber line status indications initiated within the subscriber line interface circuit.

Connections L2 to L5 of the processing unit ALAP are activated only as outputs, and connected, as needed, with one of the connections D0 to D3 of the IR/SLIC 0 or of the IR/SLIC 1. The last-mentioned connections of the subscriber line interface circuits are activated as inputs.

The connections L1 to L5, or the connections D0 to D3 function to transmit or receive operating instructions to set up either various operating conditions or feeding conditions of the subscriber line interface circuits, or to determine which subscriber line status indication results to request. In the latter case, as previously described, the connections SE/D-0 and SE/D-1 of the subscriber line interface circuits are activated as outputs and the connections L0 and L1 of the processing unit are activated as inputs.

Two additional connections L6 and L7 of the processing unit ALAP can be activated as outputs that are not connected with connections of the subscriber line units and function to transmit signals in connection with tests of subscriber lines and subscriber line units that are carried out by a special test unit (not shown).

Figure 4:
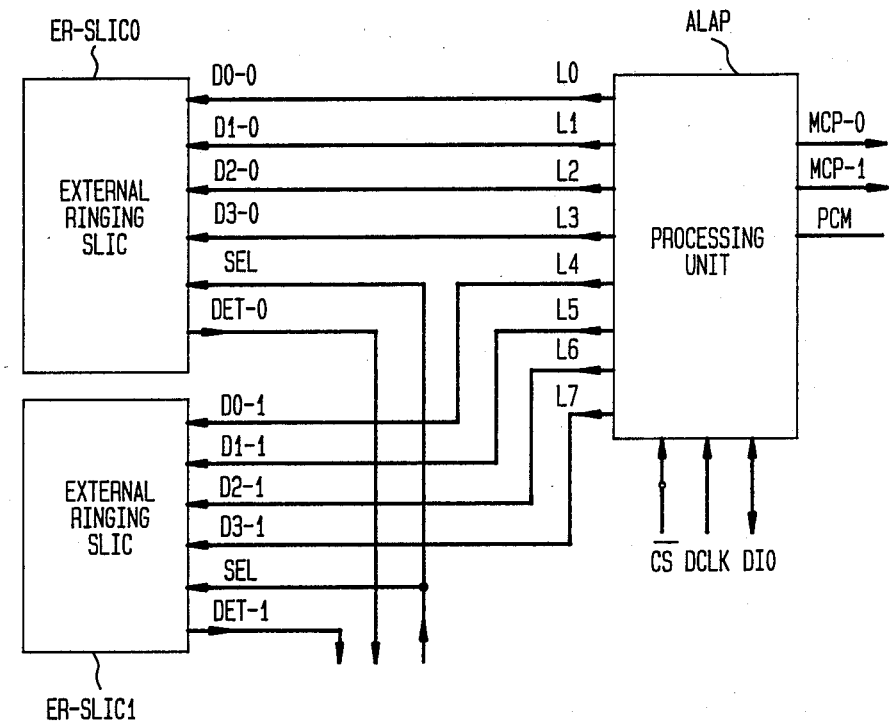
FIG. 4 is a block diagram of the interconnection of a processing unit and ER-SLIC's.

The second operating mode in which the connections of the processing unit can be operated is shown by FIG. 4. Subscriber line interface circuits ER/SLIC 0 and ER/SLIC 1 are connected, although no input/output register is provided for these connections. The subscriber line interface circuits shown are of the type in which ringing current pulses are generated outside the unit and switched on via a ringing current relay. In this operating mode, all the connections of the processing unit ALAP that are connected with connections of the subscriber line units, e.g. connections L0 to L7, are activated as outputs. A first group of these connections, e.g. the connections L0 to L3, are each connected with one of the connections D0-3 to D3-0 of the ER/SLIC 0, and a second group of connections of the processing unit, e.g. the connection L4 to L7, are each connected to another connection D0-1 to D3-1 of the ER/SLIC 1. The last-minute connections of the subscriber line interface circuit are only activated as inputs.

A further connection SEL of the ER/SLIC 0 and ER/SLIC 1, which is activated as an input, functions to receive the signals to establish the operating readiness of the units, which in the example described does not come from the processing unit ALAP.

The connections L0 to L7 of the processing unit also function to transmit operating state information in connection with the setting up of operating and feeding conditions of subscriber line units or for the requesting of the various subscriber line status indication results, which are then transmitted by the DET-0 and DET-2 of the subscriber line interface circuits which are activated as outputs, but which information is not coupled to the processing unit, as in the first operating mode. The connections L8 and L9 are available for other purposes.

We claim:

1. A digital interface circuit between at least two subscriber interface circuits over which analog subscriber lines are connected to a time multiplex switching center of a digital time-multiplexed telecommunications network, and a processing unit of the time multiplex switching center performing the coding and decoding and filtering of the telephone data transmitted over the subscriber lines under the control of its own processor, which also transmits instructions to set up the various operating conditions of the subscriber line interface circuits and instructions for determining the type of subscriber line status indications for which the subscriber lines must be interrogated, comprising:

it is designed as a parallel interface;

the processing unit has a plurality of connections to which connections are selectively allocated a level of an input/output register in which the data being received from or to be sent to, the subscriber line interface circuits and thus the subscriber lines connected to the same, are temporarily stored pending the arrival of a read or write instruction, as well as a level of a control register;

means are provided for selectively activating the connections of the processing unit as signal inputs or signal outputs depending upon which of two possible switching states the respective level of the control register is placed in;

means are provided for bringing the connections of the processing unit into a first operating mode, in which these connections serve to link up with connections of subscriber lines that also have an input/output register whose levels are allocated to some of the connections of these subscriber line units; and means for operating the connections of the processing unit in a second operating mode, in which they can be linked up with connections of subscriber line units that have no such input/output register.

2. A digital interface circuit in accordance with claim 1 wherein in the first operating mode a plurality of n connections at the processing unit are comprised of means for selectively connecting another of n plurality of subscriber line interface units and are selectively enabled and coupled as an output from said processing unit, such that said connections transmit a signal placing the subscriber line interface circuit in operating readiness, to accept input data from a subscriber line interface unit while the remaining connections to other subscriber line interface circuits are enabled only as outputs, of which at least one group of said remaining connections functions to transmit operating instructions to the subscriber line interface circuits, while at the subscriber line interface circuits one connection respectively is enabled to receive an operating readiness signal derived by said processing unit, or is activated as an output for transmission of subscriber line status indications.

3. A digital interface circuit in accordance with claim 2 further including means for activating all connections at the processing unit in n plurality of groups as outputs in said second operating mode to couple operating instructions to said subscriber line interface circuits, and means for connecting a corresponding number of connections at the connected subscriber line interface circuits to the outputs with a further connection for the reception of an operating readiness signal, and a still further connection being enabled and coupled from said processor as subscriber line status indications.

* * * * *

UNITED STATES PATENT AND TRADEMARK OFFICE
CERTIFICATE OF CORRECTION

PATENT NO. : 4,893,309

DATED : Jan. 9, 1990

INVENTOR(S) : Lechner et al.

It is certified that error appears in the above-identified patent and that said Letters Patent is hereby corrected as shown below:

On the title page:

Section [73] after "Fed. Rep. of Germany" insert --Compagnie Industrielle Des Telecommunications, Paris, France; Plessey Company Plc., Ilford, Essex, United Kingdom; and Societe Italiana Telecommunicazioni, S.p.A., Milan, Italy--.

Signed and Sealed this

Eighteenth Day of June, 1991

Attest:

HARRY F. MANBECK, JR.

Attesting Officer

Commissioner of Patents and Trademarks